United States Patent

Della Casa et al.

[11] 4,212,642
[45] Jul. 15, 1980

[54] TRANSFER PRINTING DYES

[75] Inventors: Angelo Della Casa, Basel; Urs Karlen, Magden, both of Switzerland

[73] Assignee: Ciba-Geigy AG, Basel, Switzerland

[21] Appl. No.: 926,404

[22] Filed: Jul. 20, 1978

[30] Foreign Application Priority Data

Jul. 25, 1977 [CH] Switzerland ............... 9181/77

[51] Int. Cl.² .................................. D06P 5/20
[52] U.S. Cl. .................................. 8/470; 8/471; 106/22; 260/205; 8/662; 8/681
[58] Field of Search .............. 8/2.5 A, 41 R; 106/22

[56] References Cited

U.S. PATENT DOCUMENTS 4,059,402  11/1977  Wolfrum et al. ............... 8/2.5 A

FOREIGN PATENT DOCUMENTS 49-69978   7/1974  Japan.
1528980   10/1978  United Kingdom.

OTHER PUBLICATIONS

Holland, G. and Litherland, A., J. Soc. Dyers and Colourists, Dec. 1971, pp. 488–495.
Venkataraman, K., "The Chemistry of Synthetic Dyes", vol. VIII, (Academic Press), 1978, pp. 191–195.

*Primary Examiner*—A. Lionel Clingman

*Attorney, Agent, or Firm*—Wenderoth, Lind & Ponack

[57] ABSTRACT

A process for printing flat-surface structures of manmade or regenerated polymer materials by the transfer printing process, which comprises the use of dyes of the formula

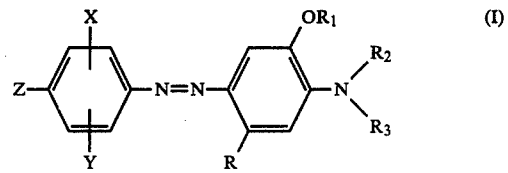

(I)

wherein
X represents hydrogen, halogen, or a lower alkylsulphone group,
Y represents hydrogen, chlorine, bromine, nitro, cyano, or an alkyl group of 1 to 4 carbon atoms,
Z represents hydrogen, chlorine, nitro, an acylamino group, or a lower alkylsulphonyl group,
R represents an alkyl radical of 1 to 4 carbon atoms, and
$R_1$, $R_2$ and $R_3$, each independently of the other, represent an alkyl radical of 1 to 4 carbon atoms, a cycloalkyl radical of 5 to 7 carbon atoms, an aralkyl or an aryl radical.

8 Claims, No Drawings

TRANSFER PRINTING DYES

The present invention relates to transfer printing dyes and the use thereof for printing flat-surface structures of manmade or regenerated polymer materials by the transfer printing process. The dyes have the formula

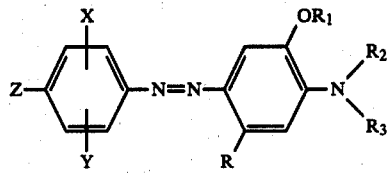

wherein

X represents hydrogen, halogen, especially chlorine, bromine or iodine, or a lower alkylsulphone group, in particular the methylsulphone groups, Y represents hydrogen, chlorine, bromine, nitro, cyano, or an alkyl group of 1 to 4 carbon atoms, Z represents hydrogen, chlorine, nitro, an acylamino group, in particular the acetylamino group, or a lower alkylsulphonyl group, in particular the methylsulphonyl group, R represents an alkyl radical of 1 to 4 carbon atoms, and $R_1$, $R_2$ and $R_3$, each independently of the other, represent an alkyl radical of 1 to 4 carbon atoms, a cycloalkyl radical of 5 to 7 carbon atoms, an aralkyl or an aryl radical.

The invention also relates to printing inks and printing pastes for transfer printing which contain, in addition to customary constituents, dyes of the formula I above, and to the preferably non-textile supports printed or impregnated with these dyes, as well as to the substrates which are dyed or printed with these dyes by the transfer printing process.

Preferred dyes are those of the formula

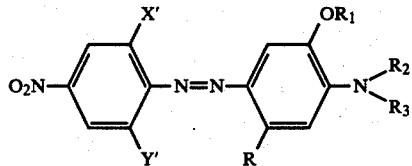

wherein

X' represents the nitro or cyano group,

Y' represents hydrogen, preferably halogen, such as chlorine or bromine, and R, $R_1$, $R_2$ and $R_3$, each independently of the other, represent an alkyl radical of 1 to 4 carbon atoms.

A further preferred group of eligible dyes of the present invention comprises those of the formula

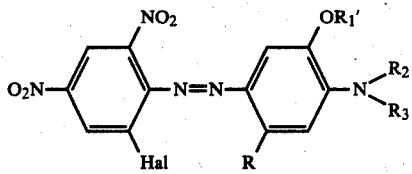

wherein

Hal represents chlorine or bromine, $R_1'$ represents methyl or ethyl, and

R, $R_2$ and $R_3$ are as defined in formula II.

Particularly interesting dyes belonging to the group of dyes of the formula III are those wherein Hal represents chlorine, bromine or iodine, R and $R_1'$ represent methyl, and $R_2$ and $R_3$ represent methyl or preferably ethyl.

Alkyl groups of 1 to 4 carbon atoms represented by R, $R_1$, $R_2$ and $R_3$ are to be understood as meaning hydrocarbon radicals which can be the same or different straight-chain or branched. In particular, they are low molecular groups, such as methyl, ethyl, propyl, isopropyl, n-butyl or tert-butyl.

A cycloalkyl group represented by $R_1$, $R_2$ and $R_3$ is in particular the cyclohexyl group.

Possible aralkyl radicals are for example: benzyl, phenethyl or the derivatives thereof which are substituted in the phenyl nucleus.

Aryl represented by $R_1$, $R_2$ and $R_3$ is preferably phenyl and the derivatives thereof, such as 4-methylphenyl, 2-methylphenyl, 4-chlorophenyl or 2- or 4-methoxyphenyl.

Surprisingly, it has been found that the eligible dyes of the present invention are distinguished by an excellent build-up, especially compared with otherwise related anthraquinone dyes. The particularly preferred blue shades also do not undergo any change in shade in artificial light, such as occurs for example with the blue hydroxyaminoanthraquinone dyes used in transfer printing.

The eligible dyes of the present invention are known or they can be obtained in a manner which is known per se by diazotisation of an aniline of the formula

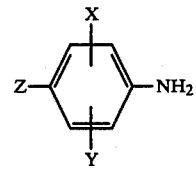

and coupling it with a coupling component of the formula

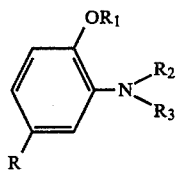

wherein X, Y, Z, R, $R_1$, $R_2$ and $R_3$ are as defined above.

The dyes of the present invention for transfer printing, their mixtures with one another and their mixtures with other sublimable dyes and/or fluorescent brightening agents, and pre-eminently suitable for printing manmade or regenerated textile fabrics by the transfer process, wherein the dyes are transferred to the fabric by diffusion and sublimation from printed supports, chiefly paper webs.

The transfer printing process is also known and is described in detail for example in French patent specification Nos. 1,223,330, 1,334,829 and 1,589,119. In this process, supports which are printed with suitable printing inks are brought into close contact with the substrate to be printed, whereupon the dye is transferred from the support to the substrate by applying heat or pressure or both.

In the case of other dyes that may be concurrently employed, these can be any dyes and/or fluorescent brightening agents that are suitable for transfer printing by virtue of their sublimation and diffusion behavior, for example disperse dyes of the following chemical classes: anthraquinoid dyes, such as hydroxyanthraquinones and/or aminoanthraquinones, azo dyes, quinophthalone dyes, styryl dyes or nitrodiarylamines.

If fluorescent brightening agents are concurrently used, they are chiefly monoazole and bisazole as well as benzoxazole derivatives, for example a fluorescent brightening agent of the formula

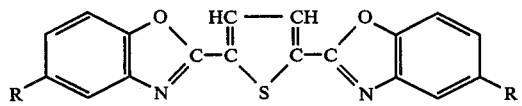

wherein R represents hydrogen, isopropyl, methyl or tert-butyl.

The dyes and/or fluorescent brightening agents that may be concurrently employed are advantageously those that, when heated, behave analogously to the dyes of this invention, especially those that show similar transfer features.

Suitable textile substrates are in particular woven fabrics, knitted fabrics or fibre fleece (nonwovens), which, for example, can be in the form of webs, piece goods or finished goods, but can also be films based on synthetic material, for example material made of acrylonitrile, for example polyacrylonitrile and copolymers of acrylonitrile and other vinyl compounds, for example acrylic esters, acrylamides, vinylpyridine, vinyl chloride or vinylidene chloride, copolymers of dicyanoethylene and vinyl acetate, as also of acylonitrile block copolymers, materials of polyvinyl chloride, cellulose triacetate and cellulose 2:½-acetate, materials of aromatic polyesters, for example those of terephthalic acid and ethylene glycol or 1,4-dimethylcyclohexane and copolymers of terephthalic acid and isophthalic acid with ethylene glycol, and especially materials from polyamides, for example polyamide 6, polyamide 66 or polyamide 12.

It is also possible to print woven or knitted fabrics which are blends of the above materials, in particular those which consist of purely synthetic hydrophobic fibres or natural and synthetic fibres.

Any kind of material, for example wool or cotton, which is impregnated, finished or coated with a synthetic polymer, can likewise be printed by the process of the invention.

The supports can be any kind of structures, preferably nontextile ones, for which disperse dyes do not possess any affinity, for preference shaped structures based on cellulose, chiefly paper, but also sheets of regenerated cellulose, which can be printed in the desired pattern with printing inks. Suitable supports are also metal sheets; but chiefly paper is used as support.

The supports can also be printed on both sides, and in the present process dissimilar dyes and/or patterns can be selected for the two sides. If it is desired to avoid using a printing machine, the printing inks can be sprayed onto the support, for example by using a spray gun. Particularly interesting effects are obtained if more than one shade is printed or sprayed onto the support simultaneously. In the process, certain patterns can be obtained, for example by using screens, or artistic patterns can be produced by using a brush. If the supports are printed, a very wide variety of printing techniques can be employed, for example the emulsion process, planographic printing (e.g. offset), relief printing (e.g. letter press printing, flexographic printing), photogravure printing (e.g. cylinder printing, rotary gravure, intaglio printing), screen printing (e.g. silk screen, film printing), or electrostatic printing.

When using dispersions, the dyes dispersed in the printing ink must in the main have a particle size of $\leq 10\mu$, preferably $\leq 2\mu$. The composition of the printing inks depends on the nature of the substrate, the printing procedure, the material of which the support is made and on other factors. It is customary to use both aqueous printing inks and those on a solvent, in particular, an alcohol basis. As a rule, they consist of at least one dye of the formula I, a binder, a solvent, and, if appropriate, a thickener, filler and dispersant. Besides water, it is possible to use practically all organic solvents that boil at atmospheric pressure at temperatures below 220° C., preferably below 150° C., and which possess a solubility or emulsifiability (dispersibility) for the dyes and binders to be used. Exemplary of organic solvents that may be used are: aliphatic and aromatic hydrocarbons, for example n-heptane and benzene, xylene or toluene; halogenated hydrocarbons, for example methylene chloride, trichloroethylene or chlorobenzene; nitrated aliphatic hydrocarbons, for example nitropropane; aliphatic amides, for example dimethyl formamide or mixtures thereof; furthermore glycols, for example ethylene glycol or polyethylene glycol monoethylether or polyethylene glycol diethylether; diethyl carbonate, dimethyl carbonate or esters, for example ethyl acetate, propyl acetate, butyl acetate, $\beta$-ethoxyethyl acetate; aliphatic or cycloaliphatic ketones, for example methyl ethyl ketone, methyl isobutyl ketone, cyclohexanone, isophorene, mesityl oxide or diacetone alcohol; mixtures of an aliphatic ketone, for example methyl ethyl ketone, and of an aromatic hydrocarbon, for example toluene; and alcohols, for example methanol, ethanol and preferably n-propanol, isopropanol, n-butanol, tert-butanol, sec-butanol or benzyl alcohol; and also mixtures of different solvents that contain at least one solvent belonging to one of the above classes.

Especially preferred solvents are esters, ketones or alcohols, for example butyl acetate, acetone, methyl ethyl ketone, ethanol, isopropanol or butanol.

In addition to containing the dye or fluorescent brightening agent and solvent (diluent), the printing inks used according to the invention additionally contain preferably at least one binder, which acts as thickener of the printing ink and binds the dye at least temporarily. Suitable for use as such binders are synthetic, semi-synthetic and natural resins, that is to say both polymerisation as well as polycondensation and polyaddition products. In principle, all resins and binders customarily employed in the printing ink and paint industry, for example those described in the lacquer raw material tables of Karsten (4th edition, Hanover, 1967) and in Wagner and Sarx's book on film-forming resins (4th edition, Munich, 1959), are used.

Preferably, physically drying resins are used, i.e. resins that do not react in the atmosphere or with one other chemically and leave behind a dry film after removal of the solvent. The use of resins that are soluble in the solvents employed is advantageous.

The following, for example, may be cited as suitable resins: colophony and derivatives thereof, hydrogenated colophony; colophony which, as calcium or zinc salt esterified with mono- or polyvalent alcohols, has been dimerised or polymerised; colophony resins modified with resinifiers such as acrylic acid and butanediol or maleic acid and pentaerythritol; the soluble phenol resins modified with colophony and resins based on acrylic compounds; maleinate resins; oil-free alkyd resins, styrenated alkyd resins, vinyl toluene modified alkyd resins, alkyd resins with synthetic fatty acids, linseed oil alkyd resins, ricinene alkyd resins, caster oil alkyd resins, soy oil alkyd resins, coconut oil alkyd resins, tall oil and fish oil alkyd resins, arylated alkyd resins, also oils and oil varnishes. Also suitable are terpene resins, polyvinyl resins such as polyvinyl acetate, polyvinyl chloride, polyvinylidene chloride, polyvinyl acetate, polyvinyl alcohol, polyvinyl ether, copolymers and graft polymers with different vinyl monomers, polyacrylic resins, acrylated resins, polystyrenes, polyisobutylene, polyesters based on phthalic acid, maleic acid, adipic acid, sebacic acid etc.; naphthalene/formaldehyde resins, furane resins, ketone resins, aldehyde resins, polyurethanes (especially urethane primary products that harden only at elevated temperature), epoxide resins (especially resin-carrier mixtures that harden only at elevated temperature, and the precondensates thereof). Suitable too are primary products of unsaturated polyester resins, dialkyl phthalate prepolymers, polyolfins such as polyethylene wax or polypropylene wax, indene and cumaronidene resins, carbamide and sulphonamide resins, polyamide and polyester resins, silicone resins, rubber and derivatives thereof, for example cyclorubber and chlorinated rubber, chiefly, however, cellulose derivatives such as cellulose esters (nitrocellulose, cellulose acetate and the like), and especially cellulose ethers, for example methyl cellulose, hydroxyethyl cellulose, hydroxypropyl cellulose, propionitrile cellulose, ethyl cellulose and benzyl cellulose. The corresponding derivatives of other polysaccharides can also be used.

The printing inks (solutions, dispersions, emulsions) are produced by the conventional methods with the resins, dyes, solvents or lithographic varnishes mentioned above and applied directly to the support, so that they can then be used for printing by the methods described above.

In order to improve the suitability of the printing inks, additional components can be added, for example plasticizers, swelling agents, high-boiling solvents, for example tetralin or decalin, ionic or non-ionic surface-active compounds, for example the condensation product of β-naphthalenesulphonic acid with formaldehyde, partially desulphonated ligninsulphonate, or the condensation product of 1 mole of octylphenol with 8 to 10 moles of ethylene oxide.

The quantitative composition of the printing inks is determined by two requirements with respect to the resin mixture and the solvent mixture.

If solvents are used, they must be present in such amounts that the resin remains dissolved and/or dispersed, and, on the other hand, the amount of solvent must be limited such that the printing ink has the necessary degree of viscosity for carrying out the printing process. Thus, for example, in gravure printing good results are obtained as a rule if the ratio of resin to solvent is between 1:0.5 and 1:50, preferably between 1:1 and 1:20.

Water-soluble thickeners, for example polyvinyl alcohol, carob bean flour, methyl cellulose or water-soluble polyacrylates, are used in aqueous inks.

Dyestuff preparations that contain above-described dyes and a resin, which can be identical with, or different from, the thickeners referred to above, are used in the production of the printing inks. If it is different from them, then the resin in question can also be a low molecular resin that produces no thickening effect and only serves to prevent an agglomeration of the finely ground dye. It is advantageous to use one of the above mentioned cellulose derivatives as resin.

The transfer printing is carried out in the usual way. To this end, the supports are brought into contact with the textile fabrics and the contact is maintained at sublimation or diffusion temperature until the dye present on the support is transferred to the textile material. As a rule a brief heating (10 to 60 seconds) to 150° to 220° C. suffices for this purpose. Transfer prints are also possible at lower temperatures, for example on polyvinyl chloride at 110° C. The transfer printing can be carried out continuously on, for example, a heated roller or also by means of a heated plate (flat iron or warm press), or by using steam or dry warm air, under atmospheric pressure or in vacuo.

If the transfer printing is carried out by means of steam, the steam jet can, for example, issue from the device that presses against the substrate to be printed, or it can be forced through the substrate to be printed, for which purpose perforated cylinders, for example, can be used.

The invention is illustrated by the following Examples, in which the parts and percentages are by weight unless otherwise stated.

EXAMPLE 1

5 parts of the navy blue dye of the formula

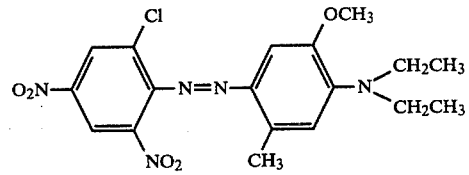

10 parts of ethyl cellulose and 85 parts of ethanol are ground for 24 hours in a ball mill. After removal of the grinding elements, a ready for use printing ink is obtained.

The above printing ink is applied to the entire surface of a smooth parchment paper by printing and subsequently dried, affording a paper support suitable for transfer printing.

Polyester fabric is laid on the pretreated support and brought into contact with the treated side thereof, whereupon support and fabric are heated for 30 seconds to 210° C. using a heating plate. A second, insulated plate, which is not heated, ensures uniform contact. The dyed fabric is then separated from the support.

A polyester fabric which is dyed in a navy blue shade of good wet- and lightfastness properties is obtained. The dye used in this Example was obtained as follows: With efficient stirring, 6.9 parts of sodium nitrile are dissolved in 100 parts of concentrated sulphuric acid at 60° C. Then 21.75 parts of 2,4-dinitro-6-chloroaniline are added at 20° to 25° C. and the mixture is stirred for 2 hours. This diazo solution is then added dropwise at 0° to 5° C. to a solution of 21.2 parts of 3-N,N-diethylamino-4-methoxy-toluene in 300 parts of 1 N sulphuric acid. The coupling is carried out by addition of 30% sodium hydroxide solution at pH 3 to 4. The precipitated dye of the above formula is collected by filtration, washed free of acid and salt and dried.

Dyes of Table 1 which are obtained in a manner analogous to that described in this Example by diazotisation of an amine and coupling with a coupling component of the formula IV and which contain the indicated substituents, are used for obtaining printing inks and for printing supports as described above. The shades indicated in the final column are obtained on polyester fabric after transfer printing.

Table 1

$$\text{(IV)} \quad \begin{array}{c} OR_1 \\ \diagup \\ \text{benzene ring with } N(R_2)(R_3) \text{ and } R \end{array}$$

| Example | Diazotised amine | Coupling component | | | | Shade |
|---|---|---|---|---|---|---|
| | | R | $R_1$ | $R_2$ | $R_3$ | |
| 2 | $O_2N$–C$_6$H$_4$–$NH_2$ (4-nitroaniline) | $CH_3$ | $CH_3$ | $C_2H_5$ | $C_2H_5$ | red |
| 3 | $O_2N$–C$_6$H$_3$(NO$_2$)–$NH_2$ (2,4-dinitroaniline) | " | " | " | " | reddish blue |
| 4 | Cl–C$_6$H$_4$–$NH_2$ (4-chloroaniline) | " | " | " | " | golden yellow |
| 5 | CH$_3$COHN–C$_6$H$_4$–$NH_2$ | " | " | " | " | yellow |
| 6 | 2-cyanoaniline (CN, NH$_2$) | " | " | " | " | orange |
| 7 | $O_2N$–C$_6$H$_3$(Cl)–$NH_2$ | " | " | " | " | violet |
| 8 | $O_2N$–C$_6$H$_3$(Cl)–$NH_2$ | " | $C_2H_5$ | " | " | violet |
| 9 | $O_2N$–C$_6$H$_2$(Br)(NO$_2$)–$NH_2$ | " | $CH_3$ | " | " | blue |
| 10 | $O_2N$–C$_6$H$_2$(Br)(NO$_2$)–$NH_2$ | " | $C_3H_7$ | " | " | blue |

Table 1-continued $$\text{(IV)} \quad \begin{array}{c} OR_1 \\ | \\ \text{benzene ring with } N(R_2)(R_3) \text{ ortho to } OR_1, \text{ and } R \text{ para to } N \end{array}$$

| Example | Diazotised amine | Coupling component R | $R_1$ | $R_2$ | $R_3$ | Shade |
|---|---|---|---|---|---|---|
| 11 | 2-chloro-4-nitro-6-nitroaniline | " | $C_2H_5$ | " | " | blue |
| 12 | 2-chloro-4-nitro-6-nitroaniline | " | $C_4H_9n$ | $CH_3$ | $CH_3$ | blue |
| 13 | 4-(methylsulfonyl)aniline | " | $CH_3$ | $C_2H_5$ | $C_2H_5$ | orange |
| 14 | 2-bromo-4-nitro-6-cyanoaniline | " | " | " | " | blue |
| 15 | 2-cyano-4-nitroaniline | " | " | $C_3H_7$ | $C_3H_7$ | bluish violet |
| 16 | 2-cyano-4-chloroaniline | " | " | " | " | red |
| 17 | " | " | $C_3H_7n$ | $C_2H_5$ | $C_2H_5$ | red |
| 18 | 4-nitro-2-methylaniline | $C_2H_5$ | $CH_3$ | " | " | red |
| 19 | 4-nitro-2-(methylsulfonyl)aniline | $CH_3$ | " | $CH_3$ | $CH_3$ | violet |
| 20 | 2-nitro-4-nitro-6-(methylsulfonyl)aniline | $NO_2$ | " | " | $C_2H_5$ $C_2H_5$ | blue |

Table 1-continued

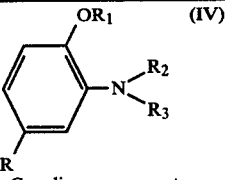

| Example | Diazotised amine | Coupling component R | $R_1$ | $R_2$ | $R_3$ | Shade |
|---|---|---|---|---|---|---|
| 21 | (4-nitro-2,6-dichloroaniline) | " | " | n-$C_4H_9$ | n-$C_4H_9$ | brown |
| 22 | (4-nitro-2,6-dibromoaniline) | " | $C_2H_5$ | $C_2H_5$ | $C_2H_5$ | brown |
| 23 | " | " | phenyl | " | " | brown |
| 24 | (2-chloro-4-nitro-6-nitroaniline) | " | cyclohexyl | " | " | blue |
| 25 | (2-bromo-4-nitro-6-nitroaniline) | " | $C_2H_5$ | $CH_3$ | $CH_3$ | blue |
| 26 | (2,4,5-trichloroaniline) | $C_2H_5$ | $CH_3$ | $C_2H_5$ | $C_2H_5$ | scarlet |

EXAMPLE 27

5 parts of the dye used in Example 1, 15 parts of nitrocellulose (containing 18% of dibutyl phthalate), 10 parts of glycol monoethyl ether, 30 parts of methyl ethyl ketone and 40 parts of ethanol are stirred for 15 minutes in a toothed disc attrition mill with a peripheral speed of about 12 m/sec, and a navy blue pattern is printed on paper with the resulting printing ink. A strong navy blue print of good light- and wetfastness properties is obtained by bringing this paper into contact with a polyester textile fabric for 60 seconds at 210° C.

EXAMPLE 28

(a) A printing ink consisting of 5 parts of the dye of Example 1, dissolved in 5 parts of ethyl cellulose and 90 parts of methyl ethyl ketone, is printed on paper. A navy blue pattern is obtained.

(b) A piece of cut paper is immersed for a brief period (e.g. 10 seconds) in the dye solution and the solvent is then removed by evaporation. The paper is suitable for use as support or for punching support pieces.

Strong navy blue prints of good wet- and lightfastness properties are obtained by bringing this support into contact with a polyester textile fabric for 60 seconds at 200° C.

EXAMPLE 29

While cooling, 20 parts of the red dye of the formula

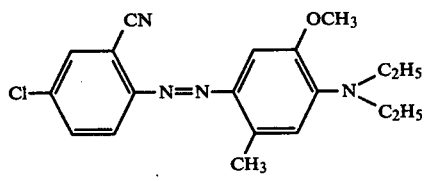

are ground in a sand mill with 20 parts of hydroxypropylcellulose and 360 parts of water for 24 hours. The grinding stock is subsequently dehydrated by spray drying. A soft, red powder is obtained that can be redispersed to form a ready for use printing ink by simply stirring the powder with water. A paper is printed with this printing ink by gravure printing. A strong red print of good wet- lightfastness properties is obtained by bringing this paper into contact with a polyamide 6 fabric for 30 seconds at 200° C.

EXAMPLE 30

(a) 1 part of the red dye of Example 29, 1 part of ethyl cellulose, 4 parts of ground sodium chloride and 1 part of diacetone alcohol are ground for 4 hours in a kneading machine at 40° to 50° C.

After the addition of 1 part of water, the paste is granulated and then ground wet while adding about 50 to 100 parts of water. The resulting suspension is filtered and washed free of solvent and salt with water. The filter cake is then dried in a vacuum drying cabinet at about 30° C.

(b) 5 parts of the resulting dyestuff preparation are stirred in the course of 30 minutes into a solution of 6.5 parts of ethyl cellulose in 88.5 parts of isopropyl alcohol using a conventional two vane stirrer. The resulting printing ink, with a uniform fine distribution of the dye, can be used for producing paper supports by dyeing, printing on one or both sides, or by spraying.

(c) A strong red print of good wet- and lightfastness is obtained by bringing such a paper support into contact with a polyester fabric for 15 to 60 seconds at 210° C.

EXAMPLE 31

1 part of the blue dye of the formula

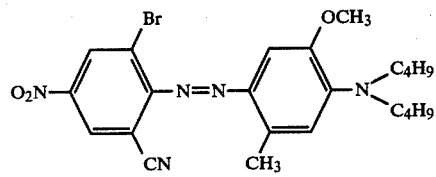

1 part of ethyl cellulose and 8 parts of water are ground for 8 hours in a sand or attrition mill. The grinding stock is separated from the grinding assistants, filtered, and the filter cake is dried in a vacuum drying cabinet. The products obtained in accordance with this Example can be processed to a printing paste as follows: 50 to 200 parts are made into a paste with a 10% aqueous locust bean gum thickening and 550 to 400 parts of water. A paper is printed with this printing paste by rotogravure printing. A strong blue print of good wet- and lightfastness properties is obtained by bringing this paper into contact with a polyester fabric for 15 to 60 seconds at 210° C.

EXAMPLE 32

Using an impeller, 15 parts of an aqueous dispersion of the dye of Example 9 in Table 1, which is prepared according to German Offenlegungsschrift 2,520,527 and contains 50% by weight of dye, are stirred into 985 parts of a stock thickening of the following composition:

50% of sodium alginate, 5% aqueous solution
45% of water, and
5% of white spirit.

The deaerated printing paste is applied with a doctor blade to a readily absorbent transfer paper as support on a vacuum table with a screen of size 62 monofilament gauze. The printed side of the dried support is laid on a fabric (polyester satin) and treated on an ironing press at 200° C. for 30 seconds. An extremely strong, sharply defined, wet- and lightfast blue print on a white ground is obtained.

What is claimed is:

1. In the process for the transfer printing of flat-surface structure of synthetic polymer materials which comprises bringing a support printed with a suitable printing ink into close contact with the flat-surface structure to be printed and applying heat, pressure or both heat and pressure to cause dyestuff to be transferred from the support to the flat-surface structure by diffusion and sublimation, the improvement according to which the printing ink printed on the support comprises at least one dyestuff of the formula

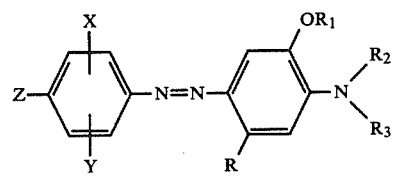

wherein
X represents hydrogen, halogen, or a lower alkylsulphone group,
Y represents hydrogen, chlorine, bromine, nitro, cyano, or an alkyl group of 1 to 4 carbon atoms,
Z represents hydrogen, chlorine, nitro, an acylamino group, or a lower alkylsulphonyl group,
R represents an alkyl radical of 1 to 4 carbon atoms, and
$R_1$, $R_2$ and $R_3$, each independently of the other, represent an alkyl radical of 1 to 4 carbon atoms, a cycloalkyl radical of 5 to 7 carbon atoms, an aralkyl or an aryl radical
and the flat-surface structure is composed of synthetic polymer material having affinity for the thus transferred dyestuff.

2. A process according to claim 1 wherein the printing ink comprises at least one dyestuff of the formula

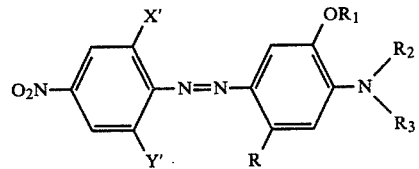

wherein X' represents the nitro or cyano group, Y' represents hydrogen or halogen, preferably chlorine or bromine, and R, $R_1$, $R_2$ and $R_3$, each independently of the other, represents an alkyl radical of 1 to 4 carbon atoms.

3. A process according to claim 1 wherein the printing ink comprises at least one dyestuff of the formula

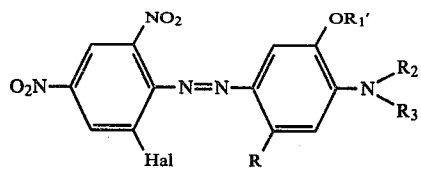

wherein Hal represents chlorine or bromine, R₁' represents methyl or ethyl, and R, R₂ and R₃ each independently of the other represents an alkyl radical of 1 to 4 carbon atoms.

4. A process according to claim 3 wherein Hal represents chlorine or bromine, R and R₁' represent methyl and R₂ and R₃ represent methyl or ethyl.

5. In an aqueous or solvent based printing ink composition which comprises dyestuff, binder and solvent, the improvement according to which the composition contains at least one dyestuff of the formula

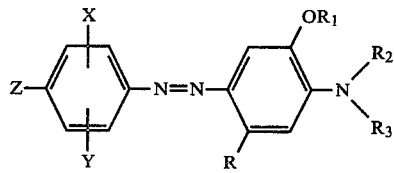

wherein
X represents hydrogen, halogen, or a lower alkylsulphone group,
Y represents hydrogen, chlorine, bromine, nitro, cyano, or an alkyl group of 1 to 4 carbon atoms,
Z represents hydrogen, chlorine, nitro, an acylamino group, or a lower alkylsulphonyl group,
R represents an alkyl radical of 1 to 4 carbon atoms, and
R₁, R₂ and R₃ each independently of the other, represent an alkyl radical of 1 to 4 carbon atoms, a cycloalkyl radical of 5 to 7 carbon atoms, an aralkyl or an aryl radical.

6. A composition according to claim 5 further containing at least one member of the group consisting of a thickener, a filler and a dispersant.

7. In a dyestuff preparation for employment in producing a printing ink composition and comprising dyestuff and a resin, the improvement according to which the preparation contains at least one dyestuff of the formula

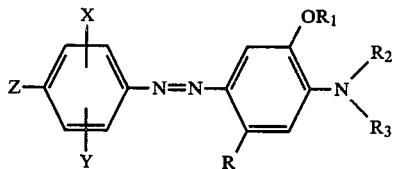

wherein
X represents hydrogen, halogen, or a lower alkylsulphone group,
Y represents hydrogen, chlorine, bromine, nitro, cyano, or an alkyl group of 1 to 4 carbon atoms,
Z represents hydrogen, chlorine, nitro, an acylamino group, or a lower alkylsulphonyl group,
R represents an alkyl radical of 1 to 4 carbon atoms, and
R₁, R₂ and R₃, each independently of the other, represent an alkyl radical of 1 to 4 carbon atoms, a cycloalkyl radical of 5 to 7 carbon atoms, an aralkyl or an aryl radical.

8. In a support for use in the transfer printing process, said support comprising a base sheet which does not possess affinity for disperse dyestuff and which has printed on at least one of its surfaces a printing ink, the improvement according to which the printing ink comprises at least one dyestuff of the formula wherein
X represents hydrogen, halogen, or a lower alkylsulphone group,
Y represents hydrogen, chlorine, bromine, nitro, cyano, or an alkyl group of 1 to 4 carbon atoms,
Z represents hydrogen, chlorine, nitro, an acylamino group, or a lower alkylsulphonyl group,
R represents an alkyl radical of 1 to 4 carbon atoms, and
R₁, R₂ and R₃, each independently of the other, represent an alkyl radical of 1 to 4 carbon atoms, a cycloalkyl radical of 5 to 7 carbon atoms, an aralkyl or an aryl radical.

* * * * *